United States Patent [19]

Quintana et al.

[11] Patent Number: 4,597,773
[45] Date of Patent: Jul. 1, 1986

[54] PROCESS FOR PARTIAL OXIDATION OF HYDROCARBONACEOUS FUEL AND RECOVERY OF WATER FROM DISPERSIONS OF SOOT AND WATER

[75] Inventors: Manuel E. Quintana, Yonkers, N.Y.; Lawrence E. Estabrook, Whittier, Calif.

[73] Assignee: Texaco Development Corporation, White Plains, N.Y.

[21] Appl. No.: 635,871

[22] Filed: Jul. 30, 1984

Related U.S. Application Data

[62] Division of Ser. No. 460,411, Jan. 24, 1983, Pat. No. 4,490,251.

[51] Int. Cl.[4] ............................................. C10J 3/46
[52] U.S. Cl. ................................. 48/197 R; 210/634; 252/373
[58] Field of Search ................... 48/197 R, 206, 212, 48/215; 252/373; 210/634; 55/85, 89

[56] References Cited

U.S. PATENT DOCUMENTS

| | | | |
|---|---|---|---|
| 4,014,786 | 3/1977 | Potter | 48/197 R |
| 4,134,740 | 1/1979 | Marion et al. | 48/197 R |
| 4,141,695 | 2/1979 | Marion et al. | 48/197 R |
| 4,466,810 | 8/1984 | Dille et al. | 48/197 R |

*Primary Examiner*—Peter Kratz
*Attorney, Agent, or Firm*—Robert A. Kulason; Albert Brent

[57] ABSTRACT

The soot-water dispersion that is produced by quenching and/or scrubbing the raw effluent gas stream from a partial oxidation gas generator in a gas quench cooling and/or scrubbing zone is resolved in a decanter using two different liquid organic extractants. Advantageously, liquid organic by-products from an oxo or oxyl process which may contain harmful water soluble constituents may be used as a major portion of the liquid organic extractant. The dispersion of soot and co-extractants that is produced may be safely disposed of as a portion of the feed to the gas generator without polluting the environment. A novel vertical decanter is provided comprising a vertical cylindrical vessel with separate inner and outer coaxial concentric conduits that pass down through the central axial flanged inlet in the upper head of the vessel. The mixture of soot-water dispersion and first liquid organic extractant i.e. naphtha is passed through the inner conduit and is discharged through a first horizontal radial nozzle located below the interface level. Simultaneously, the second liquid organic extractant i.e. liquid organic by-products from an oxo or oxyl process is passed through the annular passage between the inner and outer conduits and is discharged through a second horizontal radial nozzle located above the interface level. Adjusting means are provided to vary the discharge height of the second horizontal radial nozzle, up or down should there be a change in location of the interface level.

6 Claims, 2 Drawing Figures

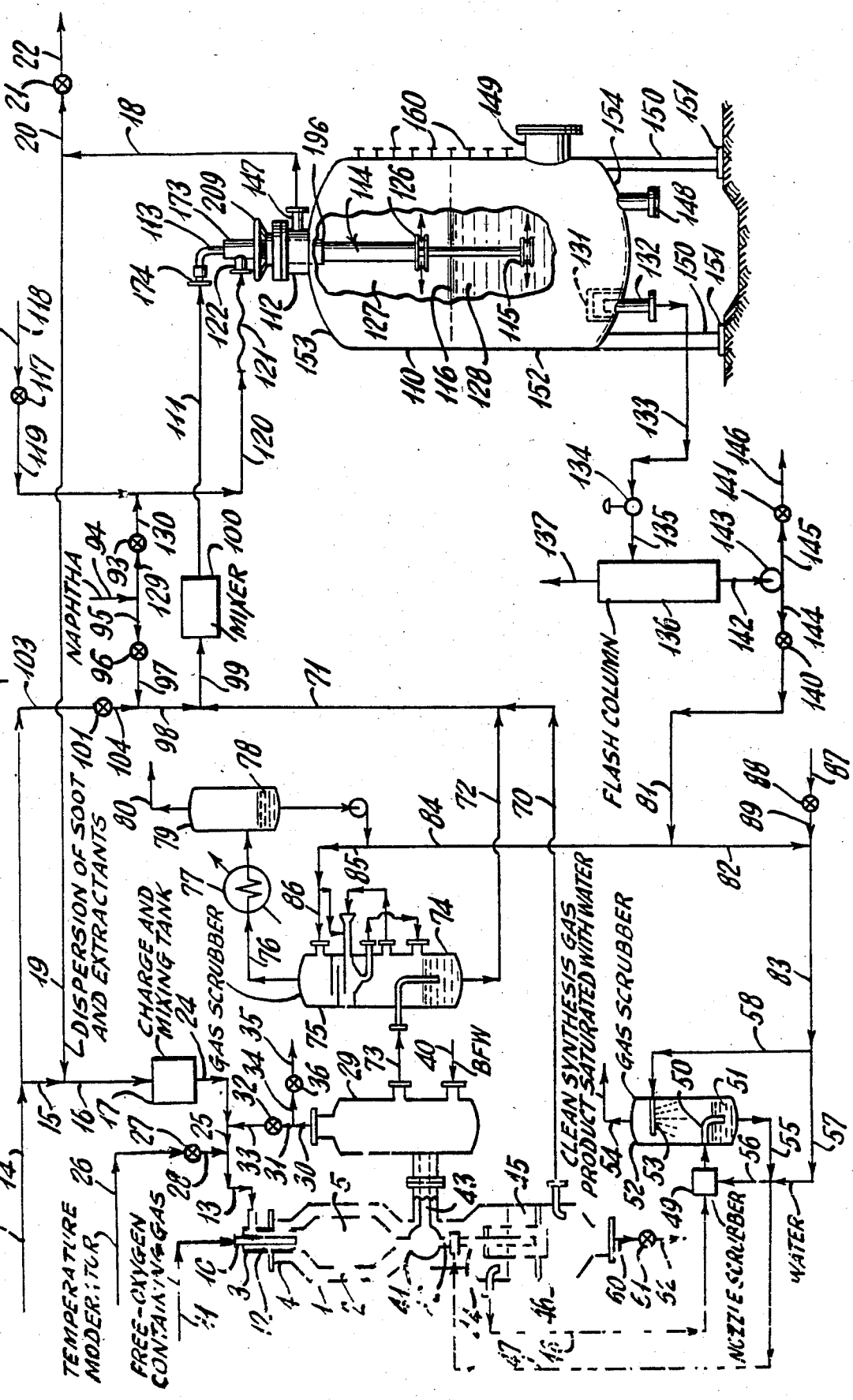

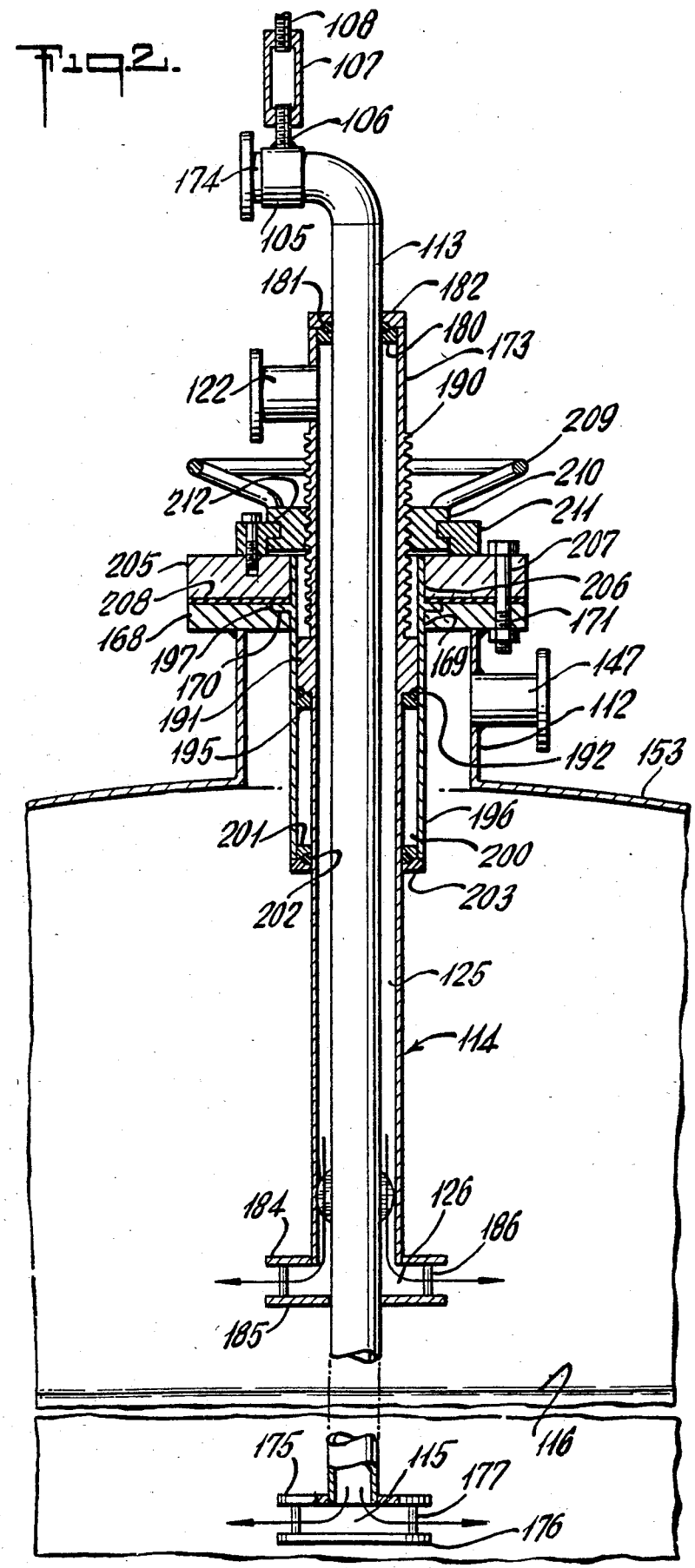

PROCESS FOR PARTIAL OXIDATION OF HYDROCARBONACEOUS FUEL AND RECOVERY OF WATER FROM DISPERSIONS OF SOOT AND WATER

This is a division of application Ser. No. 460,411, filed Jan. 24, 1983 now U.S. Pat. No. 4,490,251.

BACKGROUND OF THE INVENTION

This invention relates to the partial oxidation of liquid hydrocarbonaceous fuels including oxygen-containing hydrocarbonaceous fuels. More particularly, it relates to a process and apparatus for resolving the carbon-water dispersion that is produced when the effluent gas stream is quench cooled and/or scrubbed.

The production of synthesis gas, fuel gas, and reducing gas by the partial oxidation of liquid hydrocarbonaceous fuels is well known. By this highly economical process, gas mixtures rich in hydrogen and carbon monoxide can be produced from hydrocarbonaceous fuels, including low grade fuels. The effluent gas stream from the gas generator comprises $H_2$, $CO$, $H_2O$; at least one gas from the group consisting of $CO_2$, $H_2S$, $COS$, $CH_4$, $N_2$, and $Ar$; and about 0.2 to 20 weight percent soot (basis weight of carbon in the feedstock). The effluent gas stream may be cleaned and the entrained soot removed by quench cooling and/or scrubbing the gas stream with water. Large volumes of soot-water dispersion container about 0.5 to 2.0 weight percent soot are thereby produced. Advantageously by resolving the soot-water dispersion, soot may be recovered and recycled to the gas generator as a portion of the feed. Further, water may be recovered and recycled to the gas quench cooling and scrubbing zones.

A carbon separation process employing a single liquid organic extractant and a bottom fed decanter is described in coassigned U.S. Pat. No. 4,014,786, which is incorporated herein by reference. Liquid organic by-products from the oxo or oxyl process are used as extractants in coassigned U.S. Pat. No. 4,016,102, which is incorporated herein by reference.

The liquid organic by-products from the oxo or oxyl process may contain up to about 10 wt. % of water soluble fractions. These fractions may be harmful to acid gas solvents or catalysts located in downstream operations. Further, clumps or balls of soot may form in the carbon scrubbing equipment when these fractions are present in the scrubbing water.

By the subject invention, the by-products from the oxo or oxyl process may be used as the major portion of the extractant for the carbon extraction process, without contaminating the recycled water with the water soluble fraction. Further, a vertical decanter is provided that includes a mechanism for adjusting the inlet distributor for the second-stage introduction of the by-products of the oxo or oxyl process. By this means, the location of the inlet distributor for the second-stage extractant may be changed to compensate for any fluctuations in the location of the interface level. Smooth operation of the decanter is thereby assured.

SUMMARY OF THE INVENTION

The soot-water dispersion that is produced by quenching and/or scrubbing the raw effluent gas stream from a partial oxidation gas generator in a gas quench cooling and/or scrubbing zone is resolved in a novel two-stage vertical decanter using two different liquid organic extractants. A mixture of soot-water dispersion and a first water immiscible liquid organic extractant i.e. naphtha is introduced into the decanter below the interface level. Simultaneously, the second liquid organic extractant comprising a mixture of the liquid organic by-products from an oxo or oxyl process is introduced into the decanter above the interface layer. The second liquid organic extractant comprises a major portion of the total amount of extractant and may contain water soluble constituents which are harmful to downstream operations. Soot separates out from the soot-water dispersion and forms a dispersion that floats on the interface level. The interface layer is located between the top of a pool of clarified water which settles to the bottom of the vessel, and the bottom of a pool of dispersion comprising soot and first and second liquid organic extractants which floats on the pool of water. The clarified water is removed and at least a portion is recycled to the gas quench cooling and scrubbing zone. Simultaneously the dispersion of soot and co-extractants is removed and recycled to the gas generator as a portion of the feed.

A novel vertical decanter is provided comprising a vertical cylindrical vessel with separate inner and outer coaxial concentric conduits that pass down through the central axial flanged inlet in the upper head of the vessel. The mixture of soot-water dispersion and first liquid organic extractant i.e. naphtha is passed through the inner conduit and is discharged through a first horizontal radial nozzle located below the interface level. Simultaneously, the second liquid organic extractant i.e. liquid organic by-products from an oxo or oxyl process is passed through the annular passage between the inner and outer conduits and is discharged through a second horizontal radial nozzle located above the interface level. Adjusting means are provided to vary the discharge height of the second horizontal radial nozzle, up or down should there be a change in location of the interface level.

BRIEF DESCRIPTION OF THE DRAWING

The invention will be further understood by reference to the accompanying drawing in which:

FIG. 1 is a schematic representation of a preferred embodiment of the process. A diagrammatic representation of the decanter in elevation with a fragmented area broken away is also shown.

FIG. 2 is an enlarged vertical view in cross-section of the fragmented area of the decanter taken from FIG. 1 and showing the conduit sub-assembly mounted in the upper central axial inlet of the decanter.

DESCRIPTION OF THE INVENTION

The present invention pertains to a process and apparatus for continuously resolving the soot-water dispersion that is produced when hot raw synthesis gas from a gas generator is quench cooled or scrubbed with water. A novel two-stage decanter is used in the subject process along with two different liquid organic extractants. Light liquid hydrocarbon fuel is used as the first stage extractant and a mixture of the liquid organic by-products from the oxo or oxyl process is used as the second stage extractant. Further, the novel decanter that is used in the process may also be used in other processes which employ only a single liquid organic extractant.

Synthesis gas, reducing gas, or fuel gas is made by the partial oxidation of a hydrocarbonaceous fuel with a free-oxygen containing gas and a temperature moderator in a refractory lined free-flow unpacked steel pressure vessel such as described in coassigned U.S. Pat. No. 3,097,081 issued to DuBois Eastman et al.

The feedstreams are introduced into the reaction zone of the gas generator by means of a suitable burner. For example, a single annulus-type burner such as described in coassigned U.S. Pat. No. 2,928,460 issued to DuBois Eastman et al, or a multiple annulus-type burner as shown in coassigned U.S. Pat. No. 3,705,108 issued to C. P. Marion et al may be used.

The feedstreams are reacted in the gas generator at an autogenous temperature in the range of about 1500° to 3000° F. and at a pressure in the range of about 1 to 250 atmospheres. The reaction time in the gas generator is about 1 to 20 seconds. The effluent gas mixture leaving the gas generator comprises $H_2$, CO, $H_2O$; at least one gas from the group $CO_2$, $H_2S$, COS, $CH_4$, $N_2$ and Ar; and unreacted soot in the amount of about 0.1 to 20 weight percent (basis weight of carbon in the hydrocarbonaceous feed.)

The soot particles entrained in the hot raw effluent gas stream leaving the gas generator comprises in weight percent carbon 92 to 100, sulfur 0.0 to 4.0, and ash 0.0 to 5.0.

The amount of soot in the product synthesis gas may be controlled primarily by regulating the oxygen to carbon ratio (O/C atom/atom) in the range of 0.7 to 1.5 atoms of oxygen per atom of carbon in the fuel. The O/C ratio is based upon (1) total of free-oxygen atoms in the oxidant stream plus combined oxygen atoms in the hydrocarbonaceous fuel feed molecules, including the extractants in the feed, and (2) the total of carbon atoms in the hydrocarbonaceous fuel feed including the extractants in the feed plus carbon atoms in the recycled particulate carbon soot. The temperature in the reaction zone may be controlled by regulating the weight ratio of $H_2O$ to fuel in the range of about 0.15 to 3.0.

A wide range of carbon-containing organic materials or hydrocarbonaceous fuels, may be reacted in the gas generator to produce the raw effluent gas. The term "hydrocarbonaceous fuel", as used herein to describe various suitable feedstocks, is intended to include gaseous, liquid, and solid hydrocarbons, carbonaceous materials, and mixtures thereof, which singly or in admixture with one another are capable of sustaining an autogenous, uncatalized reaction with oxygen to produce the effluent gas stream. For example, there are (1) pumpable slurries of solid carbonaceous fuels, such as particulate carbon, concentrated sewage sludge, and mixtures thereof in water, oil, or water and oil emulsions; (2) gas-solid suspensions, such as finely ground solid carbonaceous fuels dispersed in either a temperature-moderating gas or in a gaseous hydrocarbon; and (3) gas-liquid-solid dispersions, such as atomized liquid hydrocarbon fuel and particulate carbon dispersed in a temperature-moderating gas.

The term liquid hydrocarbon, as used herein to describe suitable liquid feedstocks, is intended to include various materials, such as liquefied petroleum gas, crude oil, crude residue, heavy distillates from crude oil, asphalt, gas oil, tar-sand and shale oil, coal derived oil, aromatic hydrocarbons (such as benzene, toluene, xylene fractions), coal tar, cycle gas oil from fluid-catalytic-cracking operation; furfural extract of coker gas oil; and mixtures thereof. Gaseous hydrocarbon fuels, as used herein to describe suitable gaseous feedstocks, include methane, ethane, propane, butane, pentane, natural gas, water gas, coke-oven gas, refinery gas, acetylene tail gas, ethylene off-gas, synthesis gas, and mixtures thereof. Both gaseous and liquid feeds may be mixed and used simultaneously and may include paraffinic, olefinic, naphthenic and aromatic compounds in any proportion.

Also included within the definition of the term hydrocarbonaceous fuels are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials and mixtures thereof.

The hydrocarbonaceous feed may be at room temperature or it may be preheated to a temperature up to as high as about 600° F. to 1200° F., but preferably below its cracking temperature.

Suitable temperature moderators include $H_2O$, $CO_2$-rich gas, cooled clean gas from the gas generator or from a gas turbine which may be employed downstream in the process with or without admixture with air, by-product nitrogen from the air separation unit to be further described and mixtures of the aforesaid temperature moderators.

The term free-oxygen containing gas, as used herein, is intended to include air, oxygen-enriched air, i.e., greater than 21 mole % oxygen, and substantially pure oxygen i.e., greater than 95 mole % oxygen (the remainder comprising $N_2$ and rare gases). Free-oxygen containing gas may be introduced into the burner at a temperature in the range of about ambient to 1200° F.

The hot effluent gas stream from the reaction zone may be quenched in water in the quench zone. The gas stream is thereby quickly cooled to a temperature in the range of about 180° to 700° F. A suitable quench tank is shown in coassigned U.S. Pat. No. 2,896,927. Alternatively, the hot effluent gas stream may be passed through a waste heat boiler in indirect heat exchange with water. The cooling water is converted to steam and the process gas stream is cooled to a temperature in the range of about 500° to 900° F. The process gas stream is then scrubbed with water in a conventional gas scrubbing zone to remove suspended soot and other solid particles.

The pumpable soot-water dispersion obtained from the quench and scrubbing zones contains about 0.5 to 3 weight percent of soot. Further, it is economic to recover and recycle the water in the soot-water dispersion to the quench tank or scrubbing zone and to recycle the recovered soot to the gas generator as a portion of that hydrocarbonaceous feed. This may be accomplished in the subject process. While the subject process is referred to herein as a two-stage process, actually during the continuous operation both stages are conducted simultaneously. In the first stage, the soot-water dispersion from the quench cooling and/or scrubbing zone at a temperature in the range of about 180° to 700° F., such as about 250° to 550° F. is mixed with a first liquid organic extractant by means of a suitable conventional mixer, e.g. mixing valve, static mixer, baffled mixer, pump, orifice, nozzle, propeller mixer, or turbine mixer. High pressure will make possible the use of an extractant containing lower boiling constituents. High temperatures facilitates phase separation.

The mixed stream is passed into a phase-separation zone, for example a decanter or tank providing a relatively quiescent settling zone. In the separating zone, also known as a decanter, clarified water falls to the bottom by gravity. Dry-appearing soot particles float to the top of the clarified water along with any excess first stage extractant. The volume of the settling tank should be sufficient to provide a suitable residence time for phase separation to occur at a specified flow rate. The residence time for the water phase and the liquid organic extractant phase may be at least 2 minutes, and preferably in the range of about 5 to 15 minutes.

The pressure in the settling zone or decanter should be sufficient to maintain both the extractant and the water in liquid phase, e.g. 5 to 250 atmospheres depending upon the temperature. The temperature in the decanter will be substantially about 150° to 650° F., such as about 200° to 500° F.

The liquid organic extractant used in the first stage may be any pumpable organic liquid which is immiscible with water and for which the soot has a greater affinity for than it has for water. In addition, the first stage liquid organic extractant should contain substantially no water soluble constituent which would contaminate the water that separates from the soot in the decanter. Liquid organic by-products of the oxo and oxyl process may contain water soluble constituents which are harmful to downstream acid-gas solvents or catalysts. Also, these water soluble constituents may cause the formation of clumps or balls of soot in the decanter or soot scrubbing equipment. Accordingly, such materials are unsuitable for use as the first stage soot extraction medium. Since substantially all of the water is separated in the first stage of the subject apparatus and process, liquid organic by-products of the oxo and oxyl process may be safely used as the extractant in the second stage.

Suitable first stage liquid organic extractants are light liquid hydrocarbon fuels having an atmospheric boiling point in the range of about 100° to 750° F., degrees API in the range of over 20 to about 100, and a carbon number in the range of about 5 to 16. Examples of first stage liquid organic extractants include a light liquid hydrocarbon fuel selected from the group consisting of butane, pentane, hexane, toluol, gasoline, naphtha, and gas oil.

Thus in the first stage, the aforesaid soot-water dispersion is resolved into a clarified water layer and particles of dry-appearing soot powder which float on the surface of the clarified water. This may be accomplished by adding the first stage liquid organic extractant to the carbon-water dispersion in an amount just sufficient to render all of the soot hydrophobic but preferably insufficient to produce a soot-extractant dispersion at this point. As a result of this smaller amount of extractant, the soot separates rapidly and substantially completely from the water and floats to the surface of the clarified water layer as a dry-appearing, partially agglomerated soot along with any remaining first stage extractant.

The amount of liquid organic extractant to be added may be obtained experimentally by shake tests. Small increments of extractant are added to the soot-water dispersion until the soot separates rapidly and floats on the surface of the clarified water. Thus when the water phase is clear and the soot is dry-appearing and fluffy, the amount of extractant added in the first stage will usually fall within the range of 1 to 3 times the Oil Absorption No. of the soot in the soot-water dispersion. This amount may range between about 1.5–15 lbs. of extractant per lb. of soot or more likely in the range of about 3 to 8. For further information regarding the test method for determining the Oil Absorption No., see ASTM Method D-281-31.

In the second stage the soot is floated off the surface of the clarified water layer in the decanter by introducing a horizontal stream of second stage liquid organic extractant into said decanter above the interface between said lower layer of clarified water and an upper layer comprising a dispersion of soot in first stage and second stage liquid organic extractants.

The amount of liquid organic extractant that is introduced in the second stage is sufficient to form said soot-co-extractant dispersion containing about 0.5 to 9.0 wt. % soot in the total extractant. This amount may be about five to ten times the amount of extractant that was used in the first stage. The clarified water is continuously removed from the decanter through an outlet at the bottom of the decanter. Ordinary gaseous materials are then preferably removed from the water in a flash tower. At least a portion of the degassed water i.e. 30 to 100 wt. %, such as 50 to 95 wt. % is recycled to the quench tank and/or gas scrubbing zone. Prior to being recycled, the remainder of the degassed water if any, may be sent to a water treatment facility such as described in coassigned U.S Pat. No. 4,211,646, and which is included herein by reference.

In the preferred embodiment, the second stage liquid organic extractant is a mixture of the liquid organic by-products from the oxo or oxyl process. By introducing the second stage extractant into the upper portion of the decanter, above the interface level, the oxo or oxyl by-product extractant would have no contact with the water in the decanter. Accordingly, by the subject process, there would be no contamination of the water by water soluble constituents in the oxo or oxyl by-product extractant. This process makes feasible the use of these low value, noxious waste materials as extractants.

Additional advantages are achieved by continuously introducing at least a portion i.e. 10 to 100 wt. %, such as 50 to 100 wt. % of the dispersion of soot and co-extractants from the upper layer of the decanter into the partial oxidation gas generator as at least a portion of the fuel feed i.e. 10 to 100 wt. %, such as about 20 to 75 wt. %. Not only does this serve as a way of getting rid of noxious materials without polluting the environment, but feedstock costs are reduced. In addition, by recycling the soot-co-extractant dispersion to the gas generator as at least a portion of the feedstock, the soot-liquid organic extractant stripper may be eliminated at a substantial savings in equipment and energy costs. The stripper i.e. distillation column was previously used to recover the organic extractant i.e. naphtha for recycle to the decanter.

Operating costs for the gas generating phase are also reduced. The efficiency of the partial oxidation reaction is increased since the combined oxygen in the oxo or oxyl by-products permits the gasifier to be run with a reduced amount of free-oxygen containing gas and at a reduced temperature. Further, due to the high temperature within the decanter the decanter serves as a preheater for that portion of the dispersion of soot and co-extractants being fed to the gas generator. A cost savings is also effected by using comparatively low-cost oxo or oxyl by-product material as the second stage extractant in place of the convnetional light liquid hydrocarbon fuels, such as naphtha.

Emulsion formation is reduced or eliminated by use of the subject process and carbon decanter. This is beneficial because emulsions may lead to poor phase separation and may reduce output.

Thus, when the soot-water dispersion is resolved in the first stage of the subject process and the soot floats to the surface of the water, a minimum of extractant is added. Lower grades of first stage extractant may be used, at a cost savings. When the secondary liquid organic extractant is introduced into the layer of organic liquids in much larger amounts, a minimum of mixing takes place. Accordingly, emulsion formation is avoided even if emulsifying agents are present in the extractants.

The oxo process is the commercial application of a chemical reaction called oxonation or, more properly, hydroformylation. In this catalytic reaction, hydrogen and carbon monoxide are added across an olefinic bond to produce aldehydes containing one more carbon atom than the olefinic molecule, and the co-products shown in Table I.

The oxyl process is a method for directly producing alcohols by catalytically reducing carbon monoxide with hydrogen so as to link several partially reduced carbon atoms together. Essentially it is a modified Fischer-Tropsch Process which preferentially produces oxygenated compounds consisting mainly of alcohols, and the co-products shown in Table I.

The preferable second stage liquid organic extractant comprises a mixture of liquid organic by-products of an oxo or oxyl process and includes by definition whole samples and fractions thereof. The amount of each constituent in this liquid organic extractant may be taken from the ranges shown in Table I.

TABLE I

INGREDIENTS IN LIQUID ORGANIC BY-PRODUCTS OF OXO OR OXYL PROCESS

| Group | Carbon Range | Wt. % |
|---|---|---|
| Alcohols | $C_3$ to $C_{16}$ | 2 to 75 |
| Esters | $C_6$ to $C_{28}$ | 5 to 70 |
| Aldehydes | $C_3$ to $C_{16}$ | Nil to 25 |
| Ketones | $C_3$ to $C_{16}$ | Nil to 25 |
| Ethers | $C_6$ to $C_{28}$ | Nil to 50 |
| Acids | $C_3$ to $C_{16}$ | Nil to 10 |
| Olefins | $C_5$ to $C_{15}$ | Nil to 30 |
| Saturated Hydrocarbons | $C_5$ to $C_{28}$ | Nil to 50 |
| Water | | Nil to 15 |

If a group of compounds is present, there may be more than one compound in that group present in the extractant. For example, if the liquid organic extractant contains 65 wt. % of normal and iso alcohols and 18 wt. % of esters, then the total remaining constituents in the extractant cannot exceed 17 wt. %. The term by-products includes by definition the liquid organic waste products from the oxo or oxyl process, which have the composition shown in Table I.

The preferred maximum concentration of organic acid present in the extractant is less than 5 wt. %, for example 1-2 wt. %. For example, after the extractant is added to the carbon-water dispersion the acid content of the dispersion may be less than 15 parts per million. The organic esters are the reaction products of primary saturated alcohols and low molecular weight saturated organic acids. Advantageously, it is generally unnecessary to purify the second stage extractants.

The range of ultimate analyses of the liquid organic extractant derived from the liquid organic by-products of the oxo or oxyl process, optionally in admixture with light liquid hydrocarbon fuel if any is shown in Table II.

The elements may be taken from the ranges shown so long as the total wt. % is 100.

TABLE II

ULTIMATE ANALYSIS OF LIQUID ORGANIC EXTRACTANT
Derived From Liquid Organic By-Products of Oxo or Oxyl Process Plus Light Liquid Hydrocarbon Fuel If Any

| | Wt. % |
|---|---|
| Carbon | About 55 to 90 |
| Hydrogen | About 5 to 17 |
| Oxygen | About 3 to 40 |

The composition of a typical mixture of liquid organic by-products of an oxo process for the production of butyraldehyde, as produced for example by the process shown in Hydrocarbon Processing, Page 211, November 1969, Gulf Publishing Co., Houston, Tex. is shown in Table III.

TABLE III

Composition of Typical Mixture of Liquid Organic By-Products From Oxo Process

| | | Wt. % | |
|---|---|---|---|
| Esters | | 54 | |
| Ethers | | 20 | |
| Aldehydes | | 5 | |
| Ketones | | 5 | |
| Acids | About | 5 | and below |
| Saturated hydrocarbons | About | 1 | and below |
| Olefins | About | 1 | and below |
| n-butyl alcohol | | 3.4 | |
| i-butyl alcohol | | 0.6 | |
| Alcohol ($C_5$–$C_8$) | | 3.0 | |
| Water | | 2 | |

The esters in the aforesaid typical mixture have an average carbon number of 12 and are formed by the reaction of $C_4$ to $C_9$ alcohols and $C_3$ to $C_8$ acids. The ethers are highly branched and have an average $C_{12}$ number. The ketones have an average $C_{12}$ number, and the acids have a $C_3$–$C_5$ number. The ultimate analysis of said typical mixture is shown in Table IV.

TABLE IV

Ultimate Analysis of Typical Mixture of Liquid Organic By-Products From Oxo Process

| | Wt. % |
|---|---|
| Carbon | 69.2 |
| Hydrogen | 12.0 |
| Oxygen | 18.8 |

Other properties of said typical mixture are shown in Table V.

TABLE V

Properties of Typical Mixture of Liquid Organic By-Products From Oxo Process

Gravity, °API 29.2
Density, grams/cc 0.87
Viscosity, Centistokes at 68° F., 4.15; at 122° F., 2.0
Distillation, ASTM

| Vol. % | °F. | Vol. % | °F. |
|---|---|---|---|
| IBP | 290 | 60 | 422 |
| 10 | 326 | 70 | 450 |
| 20 | 344 | 80 | 484 |
| 30 | 360 | 90 | 526 |
| 40 | 376 | 95 | 532 |
| 50 | 396 | EP | 564 |

An improved vertical two-stage decanter is used in the subject process. Novel features of the decanter include introducing the feedstreams for each of the two stages through a sub-assembly comprising two concentric coaxial pipes that pass through the central axial inlet in the upper head of the decanter, and (2) a means for vertically adjusting, up or down, the feed conduit and horizontal radial nozzle which are used to introduce the second stage liquid organic extractant into the decanter above the interface level.

The drawing shows a decanter with an elongated vertical cylindrically shaped body having top and bottom heads, an outlet in the bottom head for the continuous and simultaneous removal of separated water, and a flanged upper central coaxial vertical cylindrical inlet whose diameter is smaller than the diameter of the vessel. The upper central inlet is centrally located in the top head of the vessel.

The separate conduits through which the feedstreams are continuously introduced pass down through the upper central inlet. An upper horizontal outlet is located in the vertical side wall of the upper flanged central inlet. A dispersion of soot and co-extractants is continuously and simultaneously removed through the upper horizontal outlet. The decanter may have other geometric forms whose horizontal cross sections are circular. Other shapes for example include: a vertical cylinder with a conical top section, a vertical cylinder with an axial cylindrical dome of smaller diameter in tandem, and a spherical shaped vessel.

Each separate feedstream is continuously and simultaneously distributed horizontally within the vessel by means of an upper and a lower horizontal radial nozzle. The velocity of the liquid feed passing through each horizontal radial nozzle may be in the range of about 0.10 to about 2.00 feet per second while the velocity of the feed passing through the inner and outer vertical feed pipes may be in the range of about 0.5 to 10 feet per second. The superficial vertical velocities of the separating phases may be on the order of about 0.1 to 2.0 feet per minute so as to allow phase separation with only gentle mixing within the upper layer. Each horizontal radial nozzle comprises two parallel discs of equal diameter which are separated by a plurality of radial fins. The radial fins also distribute the liquid charge to the decanter in a uniform 360° pattern.

The upper disc of the lower horizontal radial nozzle that is used to distribute the first stage feed mixture of soot, water and first stage extractant within the decanter has a central axial hole. The lower disc is solid. The first stage feed mixture is passed into the decanter through a straight inner conduit i.e. pipe. The inner conduit passes down through the central axial inlet in the upper head of the decanter. It then passes down along the central longitudinal axis of the decanter to a point below the interface level. The open downstream end of the inner conduit passes through the central axial hole in the upper disc of the lower horizontal radial nozzle. The outside of the inner conduit is attached to the upper disc so that the first stage feed mixture may be discharged through the lower horizontal radial nozzle and below the interface level in the lower half of the vessel. The inner conduit and attached lower horizontal radial nozzle do not have a vertical adjusting means, such as that provided for the outer conduit and attached upper horizontal radial nozzle. The lower horizontal radial nozzle may be located from about 15 to 24 inches, such as 18", below the interface level. The best location may be determined by trial and error and is a function of such parameters as Oil Absorption No., residence time, and temperature and flow rates of the streams, simultaneously entering and leaving the decanter.

Both the upper and lower discs of the upper horizontal radial nozzle that is used to distribute the second stage liquid organic extractant above the interface level in the decanter have central axial holes through which the inner conduit freely passes. A coaxial concentric outer conduit or straight pipe surrounds the inner pipe along a portion of its length. The inner and outer pipes are radially spaced from each other to provide an annular passage through which the second stage liquid organic extractant is passed. The upstream end of the annular passage is provided with a spacing ring, gasket and a retainer ring which is attached to the outer pipe for example by screws, threading or welding. This structure helps to maintain the radial distance between the outside surface of the inner pipe and the inside surface of the outer pipe while providing a seal at the upstream end of the annular passage which prevents liquids from leaking past while allowing the outer pipe to move or slide vertically up or down with respect to the inner pipe whose vertical movement is fixed.

The outer conduit passes through the central axial inlet in the upper head of the decanter. The open downstream end of the outer pipe passes through the central axial hole in the upper disc of the upper horizontal radial nozzle and is attached to said upper disc so that said annular passage is in communication with the upper horizontal radial nozzle. The bottom plate of the upper horizontal radial nozzle has a central axial hole which is slightly larger than the outside diameter of the inner conduit which passes therethrough. This bottom plate helps to maintain the radial distance between the inner and outer conduits at the downstream end of the annular passage. The upper horizontal radial nozzle may be located from about 6 to 24 inches, such as 12 inches above the interface level. The best location may be determined by trial and error and is a function of such parameters as temperature and flow rates of the streams simultaneously entering and leaving the decanter, and residence time.

Any suitable adjusting means may be provided to move the outer conduit and upper horizontal radial nozzle up or down along the central longitudinal axis of the decanter. For example, as shown in the drawing the adjusting means may comprise the threaded portion of the outside surface of the outer conduit that is engaged with the threaded portion of the hub of a rotatable wheel. Alternatively, the adjusting means may comprise a straight rack with teeth on the top face for gearing with a rotatable pinion or worm gear. For example, the back of the rack may be attached longitudinally down the outside of the outer pipe. By this means, the outer pipe and upper horizontal radial nozzle may be moved up or down by rotating a hand or motor driven pinion gear which engages the teeth of the rack.

A vertical coaxial concentric cylindrically shaped outer sleeve surrounds the outer conduit where it passes through the upper flanged central axial inlet. Mating flanges and a ring gasket seal the sleeve at its upper end. A spacing ring, gasket, and a retainer ring help to maintain the radial distance between the outside surface of the outer pipe and the inside surface of sleeve while providing a liquid-tight seal at the downstream end of the annular passage between the sleeve and the outer conduit. The retainer ring is attached to the bottom of the sleeve for example by screws, threading or welding. Liquids are thereby prevented from leaking past the seal while the outer conduit is permitted to freely move or slide vertically up or down with respect to the fixed sleeve. A portion of outer conduit has an enlarged diameter which is in slidable contact with the inside surface of the outer sleeve. The enlarged portion of outer pipe 173 in the drawing may slide up or down within the sleeve, when vertical adjustment of the outer conduit is required. This enlarged portion also serves as an additional radial spacing means between the inside surface of the sleeve and the outside surface of the outer conduit. Optionally, an additional gasket and a retainer ring may be attached to the bottom of said enlarged portion by screws or threads to provide additional protection against leaks.

DESCRIPTION OF THE DRAWING

A more complete understanding of the invention may be had by reference to the accompanying drawing which illustrates a preferred embodiment of the invention.

Although the drawing illustrates a preferred embodiment of the invention, it is not intended to limit the subject invention to the particular apparatus or materials described.

Referring to FIG. 1, gas generator 1 is a vertical cylindrically shaped unpacked free-flow non-catalytic steel pressure vessel lined with refractory 2. Annulus-type burner 3 is mounted in upper inlet 4 for introducing the reactant feedstreams into reaction zone 5.

Burner 3 includes central passage 10, through which a stream of free-oxygen containing gas from line 11 is introduced, and annular passage 12 through which a mixture of hydrocarbonaceous fuel and a stream of temperature moderator, such as steam from line 13 is introduced. Fresh liquid hydrocarbonaceous fuel feed in line 14 is passed through lines 15-16 and into fuel charge and mixing tank 17. In tank 17, the fresh liquid hydrocarbonaceous fuel is mixed with at least a portion of the recycled liquid dispersion of soot and extractants from line 19. For example, the extractant material may comprise naphtha, liquid organic by-products from an oxo or oxyl process, and mixtures thereof. The fuel feed mixture in tank 17 is passed through lines 24-25 and mixed in line 13 with a temperature moderator from line 26, valve 27, and line 28 and/or steam from gas cooler 29 by way of lines 30-31, valve 32, and lines 33 and 25. Optionally, a portion of the by-product steam may be passed through line 34, valve 36, and line 35 for use elsewhere in the system or for export. Fresh boiler feed water (BFW) enters gas cooler 29 through line 40.

The raw effluent gas stream from reaction zone 5 may be split into two gas streams in chamber 41. The two gas streams in passages 42 and 43 may be simultaneously processed downstream and separately cooled, cleaned and scrubbed with water to remove entrained soot. Alternatively, the system may be operated with all of the effluent gas streams being passed through either passage 42 or 43.

The hot gas stream in passage 42 is passed through dip-tube 44 and quenched in water 45 contained in the bottom of quench tank 46. A recycle stream of water, to be further described, is introduced into quench tank 46 via line 47. The quenched gas leaves through line 48 and is scrubbed again in nozzle scrubber 49 before passing through diptube 50 into water 51 contained in the bottom of gas scrubber 52. The gas stream then passes up through shower 53 where it is contacted with water before leaving through line 54 at the top of gas scrubber 52 as a clean stream of product synthesis gas saturated with water. Nozzle scrubber 49 may be fed with recycle water from the bottom of gas scrubber 52 by way of lines 55-56. Scrubbers 49 and 52 may be fed with water from lines 57 and 58, respectively. Accumulations of solid materials, such as solidified ash, unconverted carbon and bits of refractory may be withdrawn from time to time as required through clean-out line 60, valve 61 and line 62.

Most of the unreacted carbon i.e. soot leaving the gasifier by way of line 42 is removed when the gas stream is quenched in water 45. A stream of soot-water dispersion from the bottom of quench tank 46 is passed through line 70 and mixed in line 71 with a stream of soot-water dispersion from line 72. The latter stream of soot-water is obtained by scrubbing the second split stream of hot raw synthesis gas from line 43 with water after the gas stream is cooled by indirect heat exchange with BFW in gas cooler 29. Thus, the cooled stream of raw synthesis gas in line 73 is quenched and scrubbed with water 74 in conventional gas scrubber 75 and leaves through line 76 at the top. The gas stream is cooled below the dew point in gas cooler 77. Separation of water 78 takes place in separating tank 79, and a clean dewatered stream of product synthesis gas leaves through overhead line 80.

Scrubbing water for gas scrubbers 52 and 75 may be provided through lines 81 to 83 and 81 and 84 to 86, respectively. The scrubbing water may comprise degassed water from line 81; fresh make-up water from line 87, valve 88, and line 89; and mixtures thereof.

The soot-water dispersion in line 71 and a portion of first stage liquid organic extractant, for example, naphtha from lines 94-95, valve 96 and lines 97-98 are mixed together in line 99 and by in-line mixer 100. In such case valves 101 and 93 are closed. However, in the embodiment of the process wherein naphtha is used as both feed to the gas generator and as the first stage extractant, the fresh liquid hydrocarbonaceous fuel feed in line 14 is naphtha. In such case, valve 101 is open, valves 93 and 96 are closed, and the naphtha is passed to mixer 100 by way of lines 14, 103, 104, 98 and 99.

The first stage mixture of soot-water and naphtha passes into decanter 110 by way of line 111, and conduit sub-assembly 114 comprising inlet 174, central conduit 113, and lower horizontal radial nozzle 115. Also included in conduit sub-assembly 114 is outer conduit 173 with attached horizontal radial nozzle 126, outer sleeve 196, and a means for adjusting outer conduit 173 vertically up or down. Sub-assembly 114 passes down through upper flanged central axial inlet 112. Its vertical central axis is coaxial with the central axis of the decanter. The mixture is discharged through horizontal radial nozzle 115 located below interface level 116. Simultaneously, with valve 93 closed and valve 117 open, the second stage liquid organic extractant comprising for example a mixture of the liquid organic by-products from an oxo or oxyl process is introduced above the interface level 116 by way of lines 118-120, flexible conduit 121, inlet 122, annular passage 125 in sub-assembly 114 (see FIG. 2), and is then discharged through upper horizontal radial nozzle 126 and above interface level 116. During operation, decanter 110 is completely filled with liquid.

In the decanter, in the preferred embodiment, a dispersion of soot, naphtha, and second stage liquid organic extractant, such as a mixture of liquid organic by-products from an oxo or oxyl process forms in the upper portion 127 of the decanter and floats on water 128 which settles out by gravity below. In another embodiment, with valve 117 closed and valve 93 open, naphtha from line 94 may be introduced as the second stage extractant by way of lines 129, 130, 120 and 121.

The separated water is passed through vortex breaker 131, bottom outlet 132, line 133, pressure reducing valve 134, line 135, and flashed into flash column 136. A stream of sulfur containing gaseous impurities leaves through line 137 and is sent to a Claus unit for sulfur recovery. Alternatively, the gas stream may be flared. By means of valves 140 and 141, at least a portion of the degassed water in line 142 may be pumped by means of pump 143 through lines 144 and 81 and then through the connecting lines into quench tank 46 and gas scrubbers 49 and 52 and/or 75. The remainder of the water, if any, may be sent to a water treatment facility by way of line 145, valve 141, and line 146.

At least a portion of the dispersion of soot, naphtha, and mixture of liquid organic by-products from an oxo or oxyl process in the upper section 127 of decanter 110 is passed continuously through upper outlet 147, and lines 18, 19, 16 and into charge and mixing tank 17. The remainder, if any, of the soot dispersion in line 18 may be removed through lines 20, valve 21, and line 22 and used externally for example, as fuel.

Other elements of the vertical decanter include normally closed bottom drain outlet 148, side clean out outlet 149, support legs 150, groundpads 151, cylindrical shell body 152, upper head 153, and lower head 154. Nine trycocks 160 in spaced vertical alignment pass through the wall of the body from below mid-point to near the top. By this means liquid samples may be taken at various levels. Location of the interface level may be thereby determined. Conventional liquid-level indicators may be used in conjunction with the trycocks.

An enlarged vertical cross-section of conduit sub-assembly 114 mounted in decanter 110 is shown in FIG. 2. Sub-assembly 114 passes down through upper flanged central axial inlet 112 and along the central vertical axis of decanter 110. Inlet 112 is located in upper head 153 and is provided with side outlet 147 and circular flange 168. Flange 168 is provided with central axial hole 169, counter bore 170; and a plurality of bolt holes 171.

Sub-assembly 114 includes concentric outer pipe 173 and inner pipe 113 along with the means for the longitudinal adjustment of outer pipe 173. Any suitable conventional supporting means may be used for holding inner pipe 113 in a fixed vertical position, thereby preventing its longitudinal movement. For example, brackets or bracing means (not shown) may project upwardly from the upper portion of decanter 110 to rigidly hold inner pipe 113 near its upper end. By such means, all movement of inner pipe 113 may be prevented. For example, pipe 113 may be secured to brackets by supporting band 105, threaded rod 106, turnbuckle 107, and threaded rod 108. Annular passage 125 is located between the outside diameter of pipe 113 and the inside diameter of pipe 173. Upper inlet 174 is attached to the upper end of inner pipe 113 and is used to introduce a mixture of soot, water and first-stage liquid organic extractant. This mixture flows down through pipe 113 and is discharged through lower horizontal radial nozzle 115 into vertical cylindrical decanter 110 below the interface level 116. Radial nozzle 115 comprises upper annular disc 175 and lower disc 176. Upper disc 175 is welded at right angles to the downstream open end of pipe 113. Bottom solid disc 176 is held parallel to disc 175 by a plurality of radially directed spacers 177. Spacers 177 separate discs 175 and 176 and also direct the liquid being discharged through radial nozzle 115 in a 360° flow pattern.

Annular passage 125 is closed at the upper end by annular packing retainer plate 180, packing 181 such as an O-ring, and top annular plate 182. Packing 181 is pressed between plates 180 and 182 to provide a leak-proof seal while permitting the slidable adjustment of pipe 173 up or down. Plates 180 and 182 are attached to pipe 173 and also help to maintain the spacing of annular passage 125. The second stage liquid organic extractant, such as a mixture of the liquid organic by-products from an oxo or oxyl process, is passed through upper inlet 122 near the upstream end of outer pipe 173 and into annular passage 125. The liquid extractant flows down through annular passage 125 and is discharged through upper horizontal radial nozzle 126 and into decanter 110, above the interface level 116. Radial nozzle 126 comprises upper annular disc 184 and lower annular disc 185. Upper annular disc 184 is welded at right angles to the downstream open end of pipe 173. Bottom annular disc 185 is held parallel to disc 184 by a plurality of radially directed spacers 186. These spacers also direct the discharge of the liquid organic extractant through radial nozzle 126 in a 360° flow pattern.

A portion of pipe 173 extending below inlet 122 is provided with externally threaded section 190 followed by straight portion 191 having an increased outside diameter. Concentric, coaxial cylindrical shaped sleeve 196 surrounds outer pipe 173 and inner pipe 113 along those portions of these pipes which pass through and which may extend a little beyond upper inlet 112. The outside diameter of the straight portion 191 of pipe 173 having an enlarged outside diameter is in slidable contact with the inside diameter of sleeve 196. Optionally, the downstream end of straight portion 191 may be provided with a circular groove to hold gasket 192, such as an O-ring. Gasket 192 is pressed between the bottom of straight portion 191 and a retainer ring 195 which is attached to pipe 173. A supplemental leak-proof seal is thereby provided at the downstream end of straight portion 191 while permitting the slidable adjustment of straight portion 191 up or down within concentric outer sleeve 196.

Sleeve 196 is open at the upstream end through which pass said concentric pipes 113 and 173. It is also provided with a disc shaped annular shoulder 197 which extends perpendicular to the outside diameter of sleeve 196 below the upstream end. Shoulder 197 fits into counter bore 170 in flange 168. The portion of sleeve 196 below shoulder 197 passes through central hole 169 in flange 168. i Annular passage 200 is provided between the outside diameter of pipe 173 and the inside diameter of sleeve 196. Annular passage 200 is closed at the downstream end by annular packing retainer plate 201, packing 202 such as an O-ring, and bottom annular plate 203. Packing 202 is pressed between plates 201 and 203 to provide a leak-proof seal while permitting the slidable adjustment of pipe 173 up or down within concentric sleeve 196. A sliding fit is provided between the outside diameter of pipe 173 and the inside diameters of annular plates 201 and 203. Plates 201 and 203 are attached to sleeve 196 and also help to maintain the spacing of annular passage 200.

Top circular flange 205 has a central axial hole 206, and a plurality of bolt holes 207 that match holes 171 in flange 168. Annular shaped gasket 208 is positioned on the upper surface of horizontal flange 168. Horizontal top flange 205 is then assembled over flange 168 so that the portion of sleeve 196 extending above shoulder 197 passes through the central hole in gasket 208 and through hole 206 in top flange 205. Bolt holes 207 and 171 are lined up and flanges 205 and 168 are then bolted together.

Coaxial concentric wheel 209 with threaded hub 210 engaging threaded section 190 of pipe 173 is mounted on the upper surface of flange 205 so that outer pipe 173 may be freely raised or lowered vertically along the central axis of decanter 110 by rotating wheel 209. Clamp 211 is bolted to flange 205. Wheel 209 is secured by a portion of clamp 211 engaging circumferential groove 212 in the side of hub 210. By this means wheel 209 is rotatably mounted on the upper surface of flange 205 while the vertical movement of hub 210 is restricted. Other conventional securing means may be employed, including the use of ball bearings.

EXAMPLE

The following example illustrates a preferred embodiment of the process of this invention as related to FIG. 1 of the drawing. The example should not be construed as limiting the scope of the invention. The process is continuous and the flow rates are specified on an hourly basis for all streams of materials.

15,000 lbs. of soot-water dispersion containing 150 lbs. of soot from a quench tank and soot scrubbing unit used to quench cool and clean a stream of 451.8 thousand standard cubic feet (SCF measured at 60° F. and 1 atm.) of raw synthesis gas (dry basis) are mixed with 1,050 lbs. of naphtha.

The synthesis gas is produced in a free-flow noncatalytic partial oxidation gas generator by the partial oxidation of 9,629 lbs. of a feedstream from a fuel charge and mixing tank comprising a mixture of the following in lbs: heavy fuel oil 3,629, a dispersion of soot and liquid organic co-extractants comprising soot 150, naphtha 1,050 and liquid organic by-products from an oxo process 4,800. The specific gravity of the feedstream is 0.875, degrees API is 30.0, gross heating value is 17,280 BTU/lb. and the Ultimate Analysis in weight % follows: C 77.90, H 11.73, N 0.26, S 0.75, O 9.34 and ash 0.02. The feedstream is reacted at a temperature of 2,110° F. and a pressure of 1,000 psig with 8,476 lbs. of a free-oxygen containing gas comprising 99.5 mole % $O_2$ and 3,852 lb. of steam. The composition of the raw synthesis gas leaving the gas generator in mole % follows: CO 38.91, H 42.98, $CO_2$ 4.93, $H_2O$ 10.88, $CH_4$ 1.96, Ar 0.10, $N_2$ 0.07, $H_2S$ 0.16 and COS 0.01. Entrained in the hot effluent gas stream is 2.0 weight percent of unconverted carbon (basis weight % of carbon in hydrocarbonaceous feed to gas generator).

In the process, the aforesaid mixture of soot-water dispersion is mixed with the 1,050 lbs. of naphtha at a temperature of 200° F. The mixture is introduced into a vertical decanter, as shown in the drawing, below the interface level. Simultaneously, the 4,800 lbs. of liquid organic by-products of an oxo process having an ultimate analysis as shown in Table IV and at a temperature of about 200° F. are introduced into the vertical decanter above the interface level as the second stage extractant. Simultaneously, about 14,850 lbs. of clarified water are removed from the bottom of the decanter. After degassing, the water is recycled to the gas quench tank and/or scrubbing unit. Simultaneously, the 6,000 lbs. of soot-coextractant dispersion are removed from the top of the decanter at a temperature of about 200° F. and are recycled to said fuel charge and mixing tank. There, the dispersion is mixed with the aforesaid heavy fuel oil prior to being introduced into the gas generator, as previously described.

The process and apparatus of the invention have been described generally and by example with reference to materials of particular compositions for purposes of clarity and illustration only. It will be apparent to those skilled in the art from the foregoing that various modifications of the process and apparatus and materials disclosed herein can be made without departure from the spirit of the invention.

We claim:

1. In a continuous process for producing cool and clean synthesis gas, fuel gas or reducing gas comprising reacting a hydrocarbonaceous fuel with a free-oxygen containing gas in the presence of temperature moderator in a free-flow noncatalytic partial oxidation gas generating zone to produce a hot effluent gas stream comprising $H_2$, CO, $CO_2$, soot, and at least one gas from the group $H_2O$, $H_2S$, COS, $CH_4$, $N_2$ and Ar; quench cooling and scrubbing with water and/or cooling in a gas cooler and scrubbing with water said effluent gas stream to cool said effluent gas stream and to remove at least a portion of said soot, thereby producing a dispersion of soot and water; the improvement comprising: (1) mixing a first liquid organic extractant which is substantially immiscible with water and comprising a light liquid hydrocarbon fuel having an atmospheric boiling point in the range of about 100° F. to 700° F., degrees API in the range of over 20 to about 100, and a carbon number in the range of about 5 to 16 with said soot-water dispersion in the amount of about 1.5 to 15 lbs. of said first liquid organic extractant per lb. of soot so as to render said soot hydrophobic and to release dry-appearing powdered soot from said soot-water dispersion, thereby producing a liquid feed mixture of soot, water and first liquid organic extractant; and separating said liquid feed mixture by gravity into a clarified water layer and a soot dispersion in a closed vertical cylindrical decanter vessel substantially filled with liquid, and wherein said soot dispersion floats on said clarified water layer at the interface level; wherein said liquid feed mixture is continuously introduced into said vessel by way of a vertical conduit which is coaxial with the central vertical axis of said vessel and then through a communicating first horizontal radial nozzle located below the interface level and with said radial nozzle uniformly distributing said feed 360°, and wherein the temperature in said vessel is in the range of about 200° F. to 650° F. and the pressure is high enough to keep said liquid organic extractant in liquid phase; while (2) simultaneously and continuously introducing a second separate liquid organic extractant comprising a mixture of liquid organic by-products from an oxo or oxyl process and having the following ultimate analysis in weight %: carbon 55 to 90, hydrogen 5 to 17, and oxygen 3 to 40, into said vessel by way of conduit means which is coaxial with the central vertical axis of said vessel and then through a communicating second horizontal radial nozzle located above said interface level and which uniformly distributes the second extractant 360°; and said second liquid organic extractant is introduced into said vessel to float off the soot from the surface of the bottom water layer while forming dispersion of soot and co-extractants having a soot content in the range of about 0.5–9.0 weight percent; (3) simultaneously and separately removing a continuous stream of said separated water from an outlet in the bottom of said vessel and a continuous stream of said dispersion of soot and co-extractants from an outlet in the top of said vessel; (4) recycling at least a portion of said clarified water, with or without purification, to said gas quench cooling and/or scrubbing operations to cool and/or scrub said effluent gas stream and to produce said dispersion of soot and water; and (5) recycling at least a portion of said dispersion of soot and co-extractants to the partial oxidation gas generating zone as at least a portion of the feedstock.

2. The process of claim 1 wherein said second liquid organic extractant comprises at least one alcohol, at least one ester, and at least one constituent from the group consisting of aldehydes, ketones, ethers, acids, olefins, saturated hydrocarbons, and water.

3. The process of claim 1 wherein said first liquid organic extractant is a light liquid hydrocarbon fuel selected from the group consisting of butane, pentane, hexane, toluol, gasoline, naphtha, and gas oil.

4. The process of claim 1 wherein said second liquid organic extractant comprises the following mixture:

| Group | Carbon Range | Wt. % |
|---|---|---|
| Alcohols | $C_3$ to $C_{16}$ | 2 to 75 |
| Esters | $C_6$ to $C_{28}$ | 5 to 70 |
| Aldehydes | $C_3$ to $C_{16}$ | Nil to 25 |

-continued

| Group | Carbon Range | Wt. % |
|---|---|---|
| Ketones | $C_3$ to $C_{16}$ | Nil to 25 |
| Ethers | $C_6$ to $C_{28}$ | Nil to 50 |
| Acids | $C_3$ to $C_{16}$ | Nil to 10 |
| Olefins | $C_5$ to $C_{15}$ | Nil to 30 |
| Saturated Hydrocarbons | $C_5$ to $C_{28}$ | Nil to 15 |
| Water | | Nil to 15 |

5. The process of claim 1 wherein the velocities of the streams passing through the said first and second horizontal radial nozzles are in the range of about 0.10 to about 2.0 feet per second, and the vertical velocities of separating phases are in the range of about 0.1 to 2.00 feet per minute.

6. The process of claim 1 wherein said second liquid organic extractant is a by-product from an Oxo process and has the following composition:

| | Wt.% |
|---|---|
| Esters | 54 |
| Ethers | 20 |
| Aldehydes | 5 |
| Ketones | 5 |
| Acids | About 5 and below |
| Olefins | About 1 and below |
| Saturated hydrocarbons | About 1 and below |
| n-butyl alcohol | 3.4 |
| i-butyl alcohol | 0.6 |
| Alcohol ($C_3$–$C_8$) | 3.0 |
| Water | 2 |

* * * * *